US012240550B2

(12) United States Patent
Fiore et al.

(10) Patent No.: US 12,240,550 B2
(45) Date of Patent: Mar. 4, 2025

(54) MOBILE ROBOT HAVING A REMOVABLE WHEEL-DRIVE ASSEMBLY

(71) Applicant: Locus Robotics Corp., Wilmington, MA (US)

(72) Inventors: Brad Edward Fiore, Vernon, CT (US); Colin Alexander Davis, New Orleans, LA (US); John Stephen Lanier, New Orleans, LA (US); Seth Edwards Allen, Newton, NH (US); Peter Sussman, Wilmington, MA (US); John Hayes, Boston, MA (US)

(73) Assignee: Locus Robotics Corp., Wilmington, MA (US)

( * ) Notice: Subject to any disclaimer, the term of this patent is extended or adjusted under 35 U.S.C. 154(b) by 716 days.

(21) Appl. No.: 17/532,164

(22) Filed: Nov. 22, 2021

(65) Prior Publication Data

US 2023/0150597 A1     May 18, 2023

Related U.S. Application Data

(63) Continuation-in-part of application No. 29/815,871, filed on Nov. 17, 2021, now Pat. No. Des. 1,006,846.

(51) Int. Cl.
*B62D 65/12* (2006.01)
*B25J 5/00* (2006.01)
*B25J 9/00* (2006.01)

(52) U.S. Cl.
CPC .............. *B62D 65/12* (2013.01); *B25J 5/007* (2013.01); *B25J 9/0009* (2013.01)

(58) Field of Classification Search
CPC ........ B62D 65/12; B62D 61/04; B62D 63/02; B62D 63/025; B62D 63/04; B25J 5/007; B25J 9/0009; B25J 9/0003

(Continued)

(56) References Cited

U.S. PATENT DOCUMENTS

D251,628 S    4/1979  McQuarrie et al.
D663,333 S    7/2012  Kitano et al.
(Continued)

FOREIGN PATENT DOCUMENTS

AU    201716405     12/2017
CN    213973548 U    8/2021
(Continued)

OTHER PUBLICATIONS

International Searching Authority/EP, International Search Report and Written Opinion of the International Searching Authority, Application No. PCT/US2022/050447, dated Mar. 20, 2023, 16 pages.

(Continued)

*Primary Examiner* — Anne Marie M Boehler
(74) *Attorney, Agent, or Firm* — Sunstein LLP (57) ABSTRACT

A mobile robot having a removable wheel-drive assembly, comprising a mobile base having a chassis and a first wheel well member with a flange. There is a removable wheel drive assembly with a mounting bracket. There is a motor drive unit disposed on the mounting bracket and a wheel/tire connected to the motor drive unit via an axle. There is a second wheel well member on the mounting bracket and positioned between the motor drive unit and the wheel. The second wheel well member includes a central section having an aperture through which the axle passes and a top surface. The top surface of the central section of the second wheel well member engages with the flange of the first wheel well member of the mobile base.

12 Claims, 8 Drawing Sheets

(58) Field of Classification Search
USPC .............................................. 180/11, 15, 16
See application file for complete search history.

(56) References Cited

U.S. PATENT DOCUMENTS

| | | | |
|---|---|---|---|
| D719,620 S | 12/2014 | Clerc | |
| D722,631 S | 2/2015 | Stone et al. | |
| 8,950,038 B2 * | 2/2015 | Won ..................... | A47L 9/2857 |
| | | | 15/340.1 |
| 10,019,015 B2 | 7/2018 | Johnson et al. | |
| 10,780,930 B1 | 9/2020 | Kentley-Klay et al. | |
| 10,953,555 B2 | 3/2021 | Altman et al. | |
| 11,376,750 B2 * | 7/2022 | Radetzki .............. | B25J 19/0029 |
| 2020/0017145 A1 * | 1/2020 | Xiong ................... | B62D 21/18 |
| 2020/0369501 A1 * | 11/2020 | Zou ........................ | B66F 9/063 |
| 2021/0089053 A1 | 3/2021 | Georgeson et al. | |
| 2022/0258327 A1 * | 8/2022 | Bangalore Srinivas ..................... | |
| | | | B62D 63/04 |
| 2024/0042845 A1 * | 2/2024 | Cederwall ............. | B62D 63/02 |

FOREIGN PATENT DOCUMENTS

| | | |
|---|---|---|
| EP | 3510358 B1 | 11/2021 |
| WO | WO 2020/096507 A1 | 5/2020 |

OTHER PUBLICATIONS

Locus Robotics Corporation, *Multi-Bot Fulfillment Solution, From disruptor to the new normal—the future of robotics in a post-pandemic world*, Jul. 2, 2020, 20 pages.

\* cited by examiner

MOBILE ROBOT HAVING A REMOVABLE WHEEL-DRIVE ASSEMBLY

CROSS REFERENCE TO RELATED APPLICATION

This application is a continuation-in-part of U.S. Design patent application Ser. No. 29/815,871, filed Nov. 17, 2021, which is incorporated herein by reference in its entirety.

TECHNICAL FIELD

The present invention relates to a mobile robot having a removable wheel-drive assembly and more particularly to such a removable wheel-drive assembly which is readily field replaceable and well-sealed to increase safety and to protect against entry of dust and contaminants.

BACKGROUND ART

Autonomous mobile robots (AMRs) incorporate motor drive assemblies consisting of a motor, gearbox, axle and wheel. Replacement of such drive assemblies requires significant time, skill, and a variety of tools. Typical motor drive replacement requires removal of an external cover of the mobile robot base, disconnection of wiring, removal of the wheel assembly from a shaft, removal of the wheel well, and removal of the motor-gearbox from the robot frame. This sequence is reversed for installation of the motor new drive.

Given the complexity of the process and the time required, motor drive assemblies are not typically replaced in the field, i.e. at the facility in which the AMR is deployed. The AMR must typically be returned to the manufacturer for motor drive replacement resulting in significant downtime for the AMR, loss of productivity, and cost.

Motor drive failures may be caused by typical wear and tear over the drive's expected lifetime. Failures may also happen prematurely due to defective components or due to excessive contamination getting into the drive components. Facilities in which the AMRs operate may be subject to a significant amount of dust and other contaminates which can get into the motor drive components and cause premature motor drive failures. These kind of failures are particularly common as the components of typical motor drive units are not well sealed to protect against penetration of such dust and particulate matter.

An additional issue can result from the components of motor drive units not being well sealed from the environment. That is, when the components are not well covered, injuries can result, such as finger entrapment between the wheel and the wheel well.

Therefore, there is a need for a motor drive assembly, which is field replaceable and which is well-sealed to protect against entry of dust and contaminants and to increase safety.

SUMMARY OF THE EMBODIMENTS

In accordance with one embodiment of the disclosure there is a mobile robot having a removable wheel-drive assembly. The mobile robot includes a mobile base having a chassis and a first wheel well member including a flange. The removable wheel drive assembly includes a mounting bracket configured to be removably connected to the chassis of the mobile robot proximate the first wheel well member. There is a motor drive unit disposed on the mounting bracket and a wheel connected to the motor drive unit via an axle. The wheel has a tire disposed thereon. There is a second wheel well member disposed on the mounting bracket and positioned between the motor drive unit and the wheel. The second wheel well member includes a central section having an aperture through which the axle passes and a top surface. The top surface of the central section of the second wheel well member engages with the flange of the first wheel well member of the mobile base when the removable wheel drive assembly is mounted on the mobile base.

In one or more embodiments the following features may be included. The flange of the first wheel well member may be arched and the top surface of the central section of the second wheel well member may be arched and have a curvature that conforms with a curvature of the arched flange of the first wheel well member. The second wheel well member may include a first side section extending in a first direction from the central section and a second side section extending in a second direction from the central section, wherein the second direction is opposite the first direction. The second wheel well member may include a first curved fender extending outwardly from a face of the first side section and positioned proximate a tread surface of the tire. The first curved fender may be conformed with a curve of the tread surface of the tire and the second wheel well member may include a second curved fender extending outwardly from a face of the second side section and positioned proximate the tread surface of the tire. The second curved fender may be conformed with the curve of the tread surface of the tire. The second wheel well member may further include a first wheel well cover having a curved edge affixed to an edge of the first curved fender and extending in the first direction away from the first curved fender. There may be a second wheel well cover having a curved edge affixed to an edge of the second curved fender and extending in the second direction away from the second curved fender.

In other embodiments the following additional features may be included. The arched flange of the first wheel well member and the arched top surface of the central section of the second wheel well member may each have a curvature which conforms with the curvature of the wheel. When the arched flange of the first wheel well member and the arched top surface of the central section are mated they may form a wheel well surface. The second wheel well member may include a base portion connected to the mounting bracket and the mounting bracket may be connected to the chassis of the mobile robot with a plurality of fasteners. The motor drive unit may be a right-hand drive unit including a motor and a gearbox. The wheel well surface may be spaced less than 2 mm from the tire. The first curved fender may have a first surface with a width substantially equal to a width of a tread surface of the tire and the second curved fender may have a second surface with a width substantially equal to the width of the tread surface of the tire. The first wheel well member may include an arched surface with a width substantially equal to a width of a tread surface of the tire and having a first end aligned with the first surface of the first curved fender. There may be a second end aligned with the second surface of the second curved fender when the when the removable wheel drive assembly is mounted on the mobile base. The first surface, the second surface, and the arched surface may each be spaced less than 4 mm from the tread surface of the tire. The arched flange may be adjacent to extends in a direction perpendicular to the arched surface of the first wheel well member.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments, as the skilled artisan would recognize, even if not explicitly stated herein.

Descriptions of well-known components and processing techniques may be omitted to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

It is desired to provide a mobile robot with a wheel drive assembly that can be easily removed and replaced with minimal time, skill and tooling. The concept described herein permits the motor drive assembly to be removed from the bottom of the robot by disconnecting wiring and removing several screws. The motor drive assembly described herein is also well-sealed to protect against entry of dust and contaminants into the components which may cause premature failure. Additionally, the design restricts access to the components of the motor drive assembly when it is installed on a robot which can prevent injuries, such as finger entrapment between the wheel and the wheel well.

Figure 1:
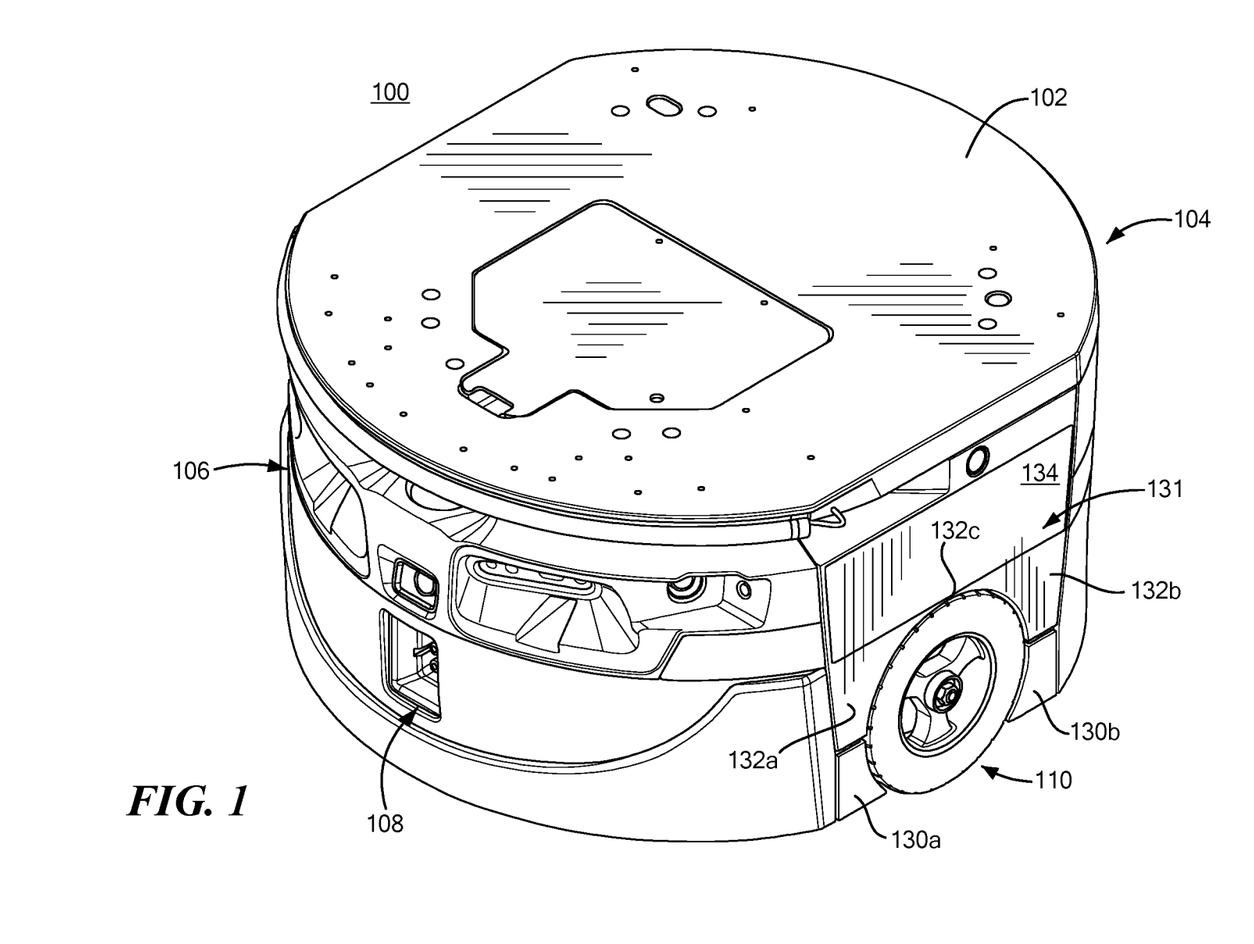
FIG. 1 is a front and side perspective view of an autonomous mobile robot with a replaceable wheel drive assembly according to an embodiment of this disclosure.

An autonomous mobile robot 100, according an embodiment of this disclosure, is shown in FIG. 1. Mobile robot 100 includes a platform 102 for carrying items directly or for supporting a shelving unit or other form of tote and a mobile base 104. The mobile robot may include a mast unit (not shown) for mounting a user input device, such as handheld computer like an ipad®. There is also an array of sensors 106 at the front of mobile base 104, which may include laser radar (LIDAR) and vision cameras, used for navigation. Charging port 108 is included so the robot may autonomously dock at a charging station to recharge its batteries. Mobile base 104 also includes two removable wheel drive assemblies 110 and 112 (see FIG. 2) on either side of the mobile base 104. Caster wheels 114 and 116 at the front and rear, respectively, of the mobile base 104 are shown in FIG. 2.

One example of robot 100 is described in U.S. Pat. No. 10,019,015, for use in warehouse order fulfillment. The operation and application of robot 100 is not critical to the removable wheel drive assemblies described and claimed herein so they will not be described further. The removable wheel drive assemblies described and claimed herein may be used with various types of mobile robots designed for any suitable robot application.

Figure 2:
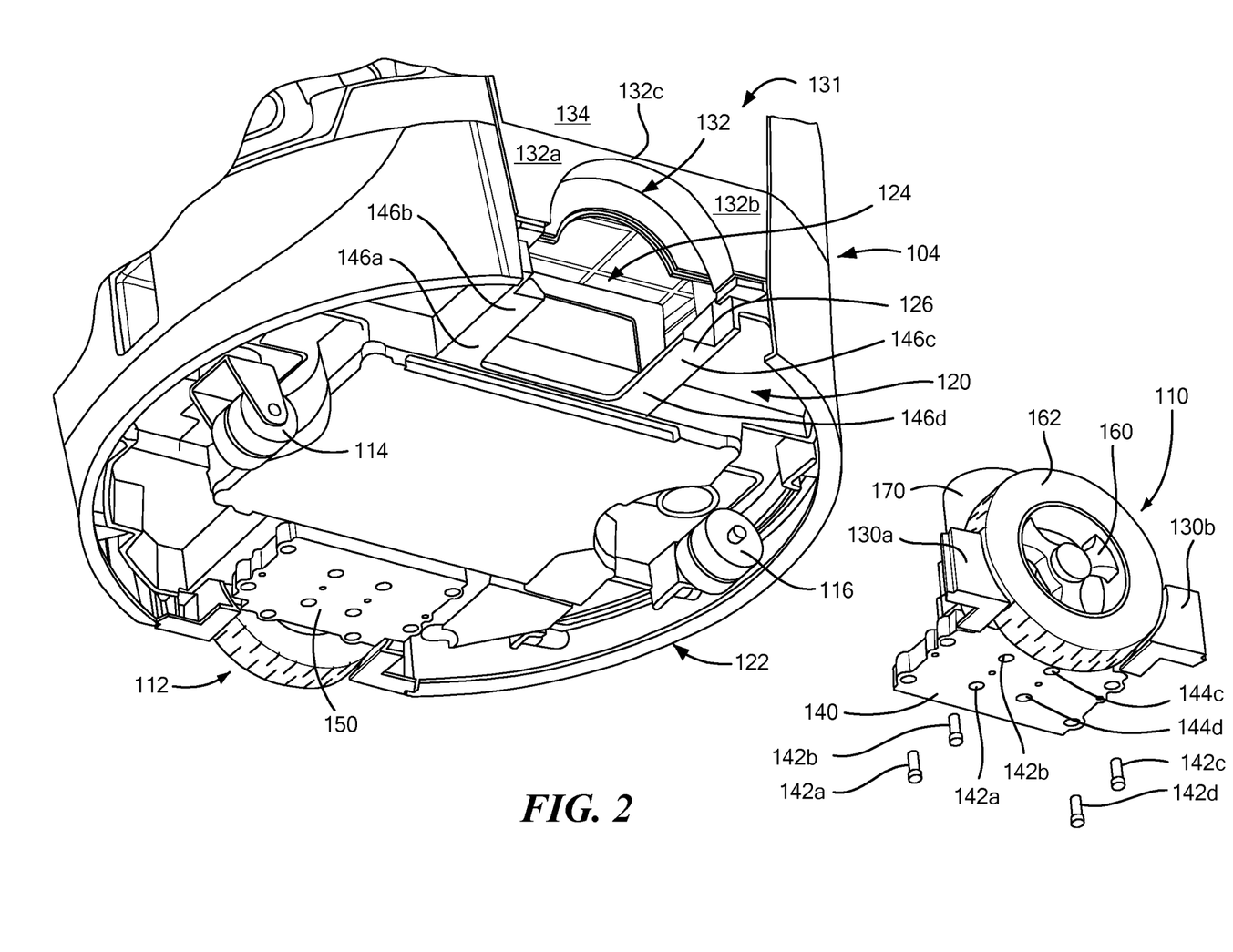
FIG. 2 is bottom and side perspective view of the autonomous mobile robot of FIG. 1 with a replaceable wheel drive assembly removed.

Referring to FIGS. 1 and 2, mobile base 104 may include a frame or chassis 120 on which are mounted removable wheel drive assemblies 110 and 112 and caster wheels 114 and 116. There is an exterior cover 122, which may comprise a number of exterior cover components, including upper wheel well cover 131, including leg portions 132a and 132b, which are interconnected by an arch portion 132c. Upper wheel well cover 131 forms part of upper wheel well member 132, described below. Part of upper wheel well cover 131 disposed above leg portions 132a and 132b is label region 134. Label region 134 may be used to display insignia, such as a logo or name/number associated with the robot. Lower wheel well cover portions 130a and 130b of wheel drive assembly 110, mate with leg portions 132a and 132b of upper wheel well cover portion 131 when removable wheel drive assemblies 110 is installed. Together, these exterior cover components interconnect to form a part of the exterior cover 122, as best shown in FIG. 1.

As shown in FIG. 2, removable wheel drive assembly 110, includes mounting bracket 140 on which the components of the wheel drive assembly are mounted when installed within wheel drive region 124. The mounting bracket 140 may be installed on mobile base 104 by means of fasteners (e.g. screws) 142a-142d inserted through holes 144a-144d in the bottom of mounting bracket 140 and secured in holes 146a-146d in frame member 126. The bottom of mounting bracket 150 of removable wheel drive assembly 112 is shown in the installed position. Other components disposed on mounting bracket 140 include wheel 160 on which is mounted tire 162. There is also included a motor drive unit 170.

An advantage of using a standard mounting bracket, like mounting brackets 140/150, is that it can provide standard mounting platform that is easily installable and removable on the robot base, but can support different motor drive assemblies. This allows for diversity of suppliers or for field replacement of an obsolete drive assembly with updated units not directly providing identical mounting features. In other words, the mounting plate can serve as an adapter.

Figure 3:
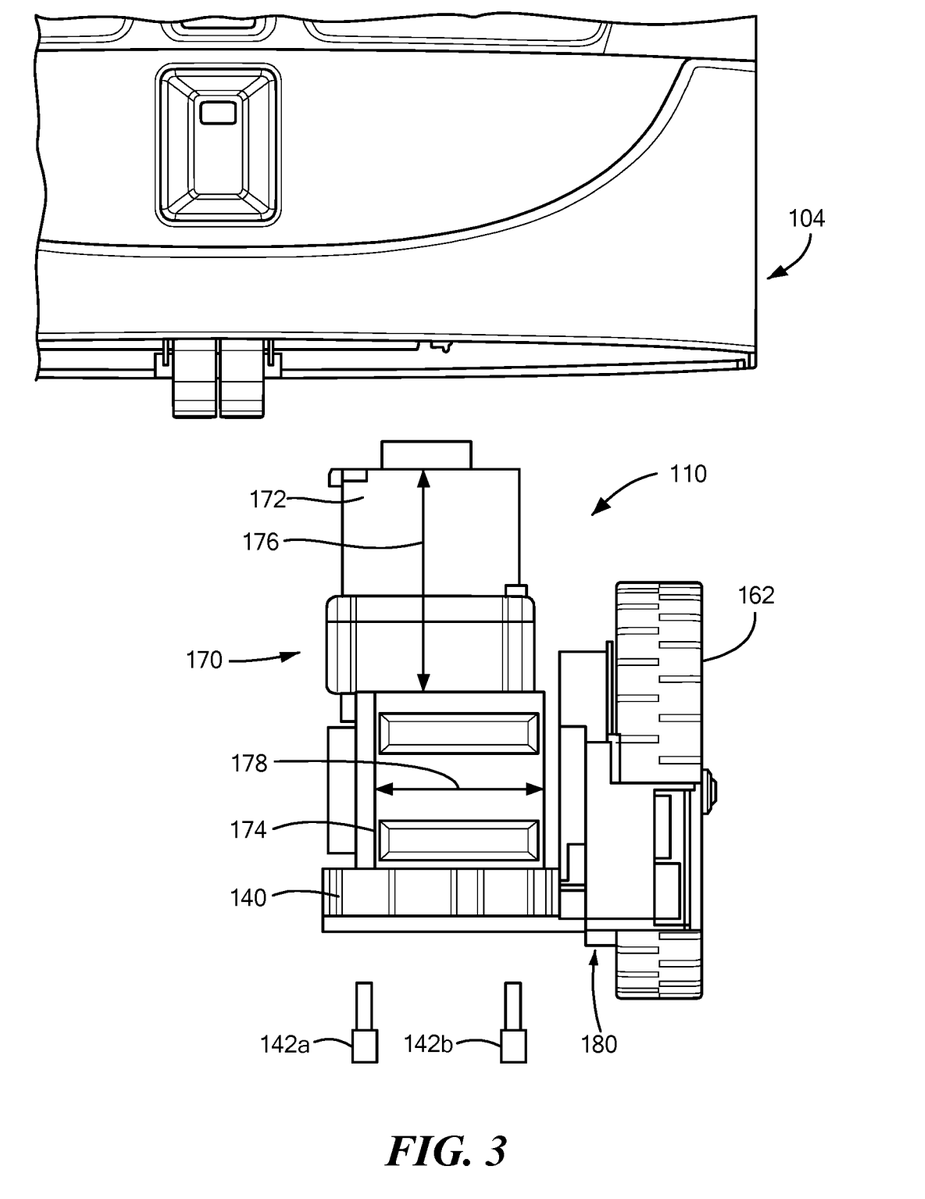
FIG. 3 is a front perspective view of a portion of the autonomous mobile robot of FIG. 1 with a replaceable wheel drive assembly removed.

Referring now to FIG. 3, a side perspective view of removable wheel drive assembly 110 is shown. In this view, motor drive unit 170 is shown to include an electric motor 172 integrated with a gear box unit 174, which is interconnected to an axle (not shown). In turn, the axle is connected to the wheel 160 (also not shown in this view). Wheel drive assembly 110 is a right hand type drive with electric motor unit 172, having a vertically oriented axis of rotation 176, which at a right angle to the horizontally oriented axis of rotation 178 of the gear box unit 174. While not a requirement of the wheel drive assembly disclosed herein, this type of drive unit is desirable as it is compact and readily mountable on mounting bracket 140.

Figure 4A:
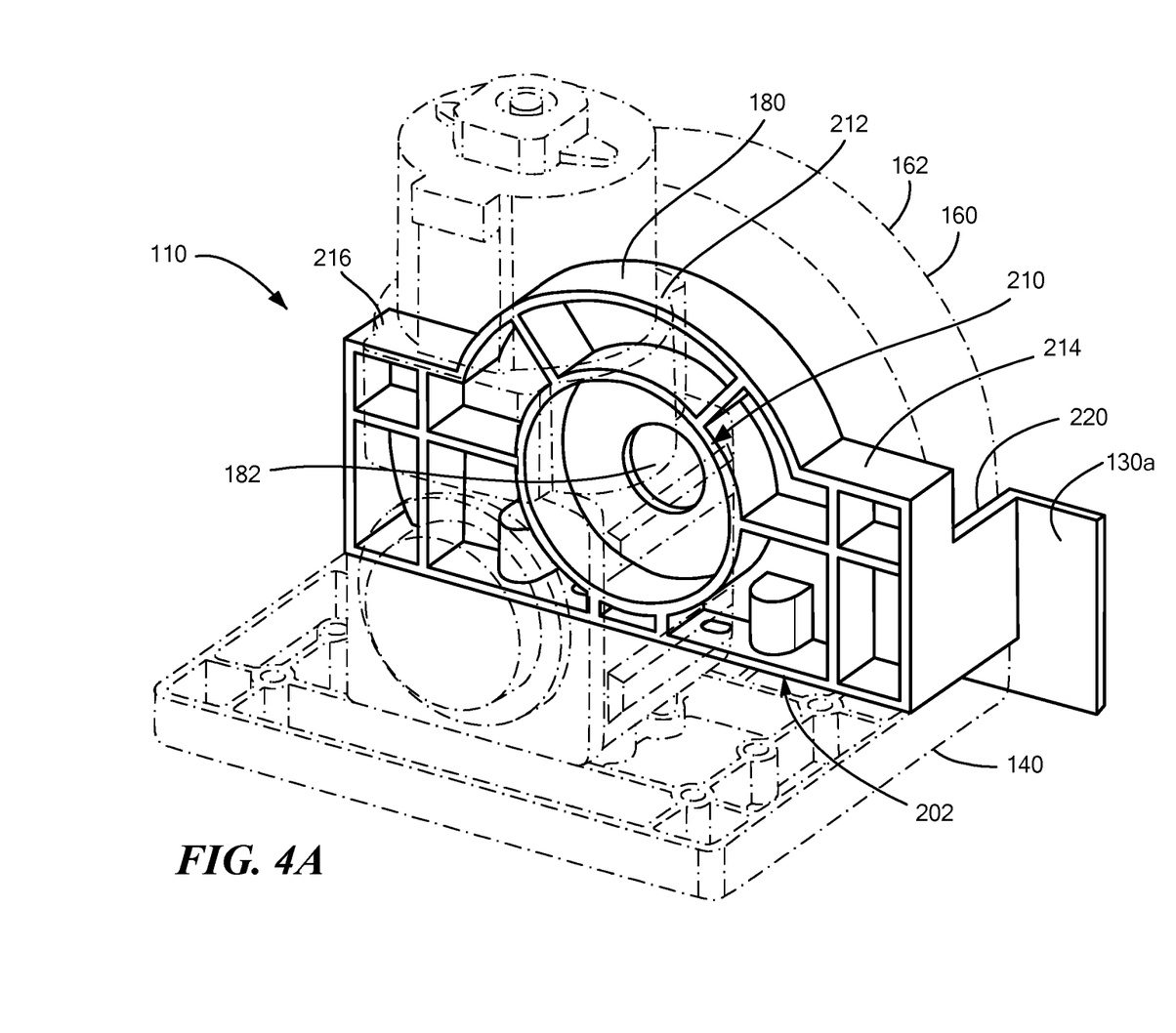
FIG. 4A is a side perspective view of the lower wheel member of the replaceable wheel drive assembly with the remainder of the wheel drive assembly shown in phantom.
Figure 4B:
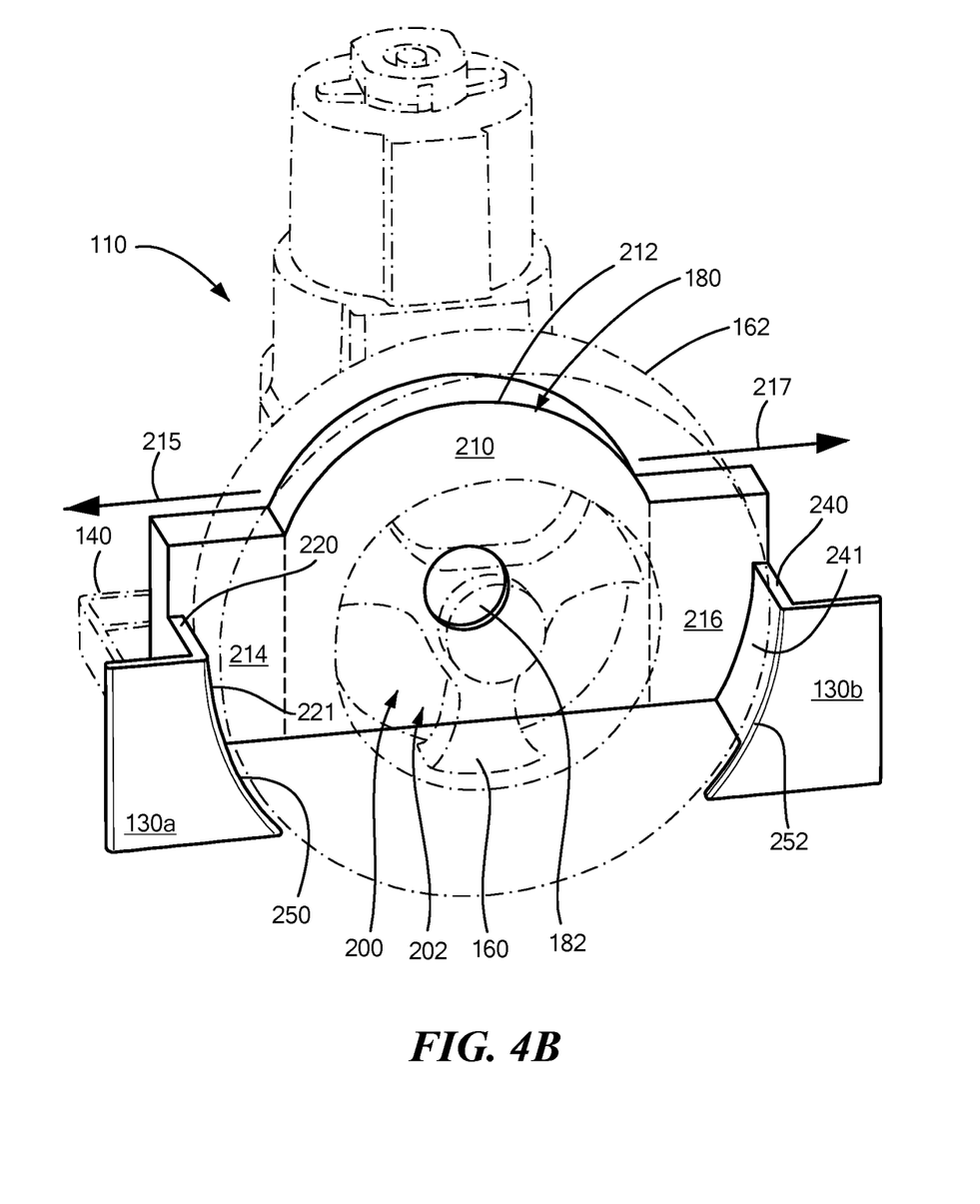
FIG. 4B is a front perspective view of the lower wheel member of the replaceable wheel drive assembly with the remainder of the wheel drive assembly shown in phantom.

Continuing to refer to FIG. 3 and to FIGS. 4A and 4B, disposed on mounting bracket 140 is a lower wheel well member 180 positioned between gearbox 174 of the motor drive unit 170 and the wheel 160/tire 162. Wheel 160 is disposed on an axle (not shown) which passes through aperture 182 and connects gearbox 174 to wheel 160. As described further below, upper wheel well member 132 mates with a lower wheel well member 180 on the removable wheel drive assembly 110 to form a sealed wheel well. The upper and lower wheel well member are designed to interconnect when removable wheel drive assembly 110 is mounted on mobile base 104 to form a seal to limit/prevent dust (and other matter) from entering the motor drive unit 170, which may otherwise cause premature failure of motor drive unit 170. The upper and lower wheel well members and external cover components also guard against safety issues, such as finger entrapment between wheel and wheel well. In addition to the connection between the upper and lower wheel well portions, the design also provides a minimized amount of clearance between the wheel well portions and the wheel 160 and tire 162.

Figure 5A:
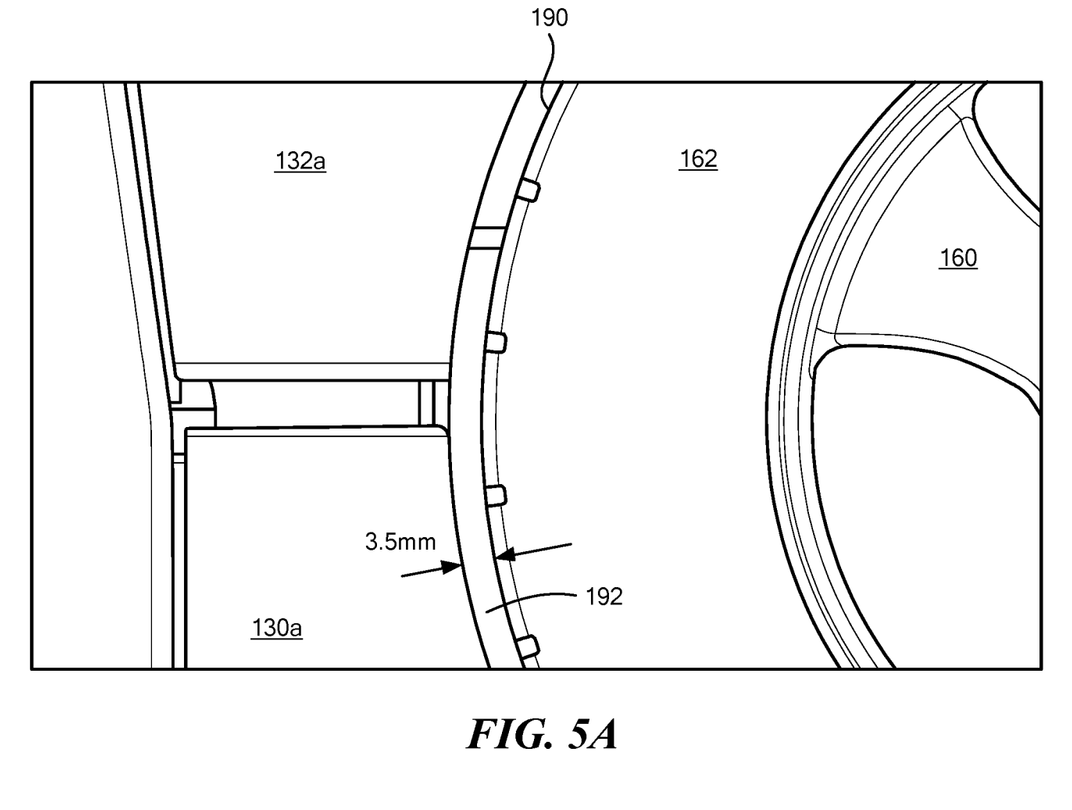
FIG. 5A is an enlarged side view of a portion of the autonomous mobile robot of FIG. 2.
Figure 5B:
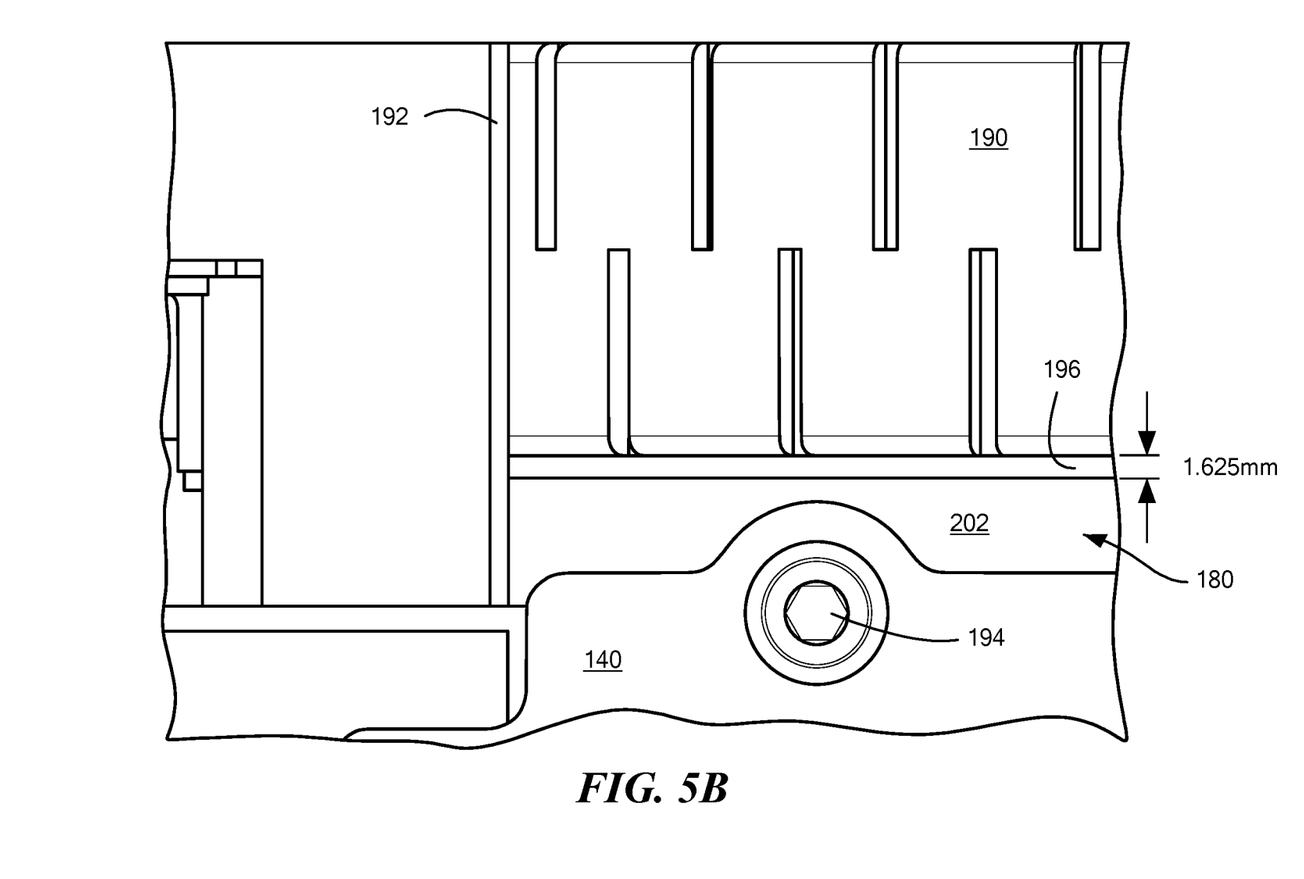
FIG. 5B is an enlarged bottom view of a portion of the autonomous mobile robot of FIG. 2.

Referring to FIGS. 5A and 5B, the minimized clearances between the wheel well members and the wheel 160 and tire 162 are depicted. Wheel well cover portion 130*a*, which forms part of lower wheel well member 180, is spaced a very small distance from tire 162, forming a minimized gap 192, as shown in FIG. 5A. In this example, the gap is approximately 3.5 mm from the tread surface 190 of tire 162. This gap distance may be made smaller or larger, but typically gap 192 would be small enough to prevent insertion of a little (or "pinkie") finger of a smaller sized person.

In FIG. 5B a bottom plan view of lower wheel well member 180 is shown. In this view, the connection of the base 202 of wheel well member 180 to mounting bracket 140 via bolt 194 is shown. A very small gap, gap 196, between the front surface 200 of wheel well portion 180 and the edge of tire tread surface 190 of tire 162 is shown. In this example, the gap is approximately 1.625 mm, but the typical size gap 196 would be small enough prevent insertion of a little (or "pinkie") finger of a smaller sized person.

Turning back to FIGS. 4A and 4B, the design of lower wheel well member 180 is further described. The remainder of the removable wheel drive assembly 110 (i.e. all but wheel well member 180) is shown in phantom in FIGS. 4A and 4B, so the focus of these views and the description herein is on the wheel well member 180. Lower wheel well member 180 includes a base portion 202, which sits on and is connected to the mounting bracket 140 as indicated above with regard to FIG. 5B. While the wheel well portion 180 is a single integrated component, for description purposes only, it is described in sections, which are divided by broken lines in FIG. 4B. First, there is a central section 210 having an aperture 182 through which the axle (not shown) passes. Central section 210 has a curved or arched top surface 212, which may be conformed to the curvature of wheel 160/tire 162. There is a first side section 214 extending in a first direction indicated by arrow 215 away from the central section 210. There is a second side section 216 extending in a second direction indicated by arrow 217 away from the central section 216. The second direction is opposite the first direction.

Extending from first side section 214, in a direction perpendicular to front surface 200 (i.e. outwardly from the front surface), is a first curved fender 220. First curved fender 220 has a curved surface 221, which faces tread surface 190 of tire 162 and is in close proximity thereto, i.e. spaced by gap 192 of FIG. 5A. The curved surface 221 has a width approximately equal to the width of tread surface 190. The curved surface 221 is conformed to the curvature of tread surface 190 of the tire 160.

Extending from second side section 216, in a direction perpendicular to front surface 200 (i.e. outwardly from the front surface), is a second curved fender 240. Second curved fender 240 has a curved surface 241, which faces tread surface 190 of tire 162 and is in close proximity thereto, i.e. spaced by gap 192 of FIG. 5A. Curved surface 241 has a width approximately equal to the width of tread surface 190. Curved surface 241 is conformed to the curvature of tread surface 190 of the tire 160.

Lower wheel well cover portions 130*a* and 130*b* of FIGS. 1 and 2, are described with respect to FIGS. 4A and 4B. Lower wheel well cover portion 130*a* has a curved edge 250 affixed to and conforming with a curved edge of curved surface 221 of first fender 220. The wheel well cover portion 130*a* extends from curved edge 250 in a direction parallel to arrow 215. Wheel well cover portion 130*b* has a curved edge 252 affixed to and conforming with a curved edge of curved surface 241 of second curved fender 240. Wheel well cover portion 130*b* extends from curved edge 252 in a direction parallel to arrow 217.

As described further below with regard to FIG. 6, upper wheel well member 132 mates with a lower wheel well member 180 on the removable wheel drive assembly 110 to form a sealed wheel well when removable wheel drive assembly 110 is installed on wheeled base 104. The upper and lower wheel well members are designed to interconnect when removable wheel drive assembly 110 is mounted on mobile base 104 in wheel drive region 124 to form a seal to limit/prevent dust (and other matter) from entering the motor drive unit 170, which may otherwise cause premature failure of motor drive unit 170. In addition, wheel well cover portions 130*a* and 130*b* of lower wheel well member 180 mate with leg portions 132*a* and 132*b* of upper wheel well portion 131 to form a sealed external cover portion about wheel drive region 124.

Figure 6:
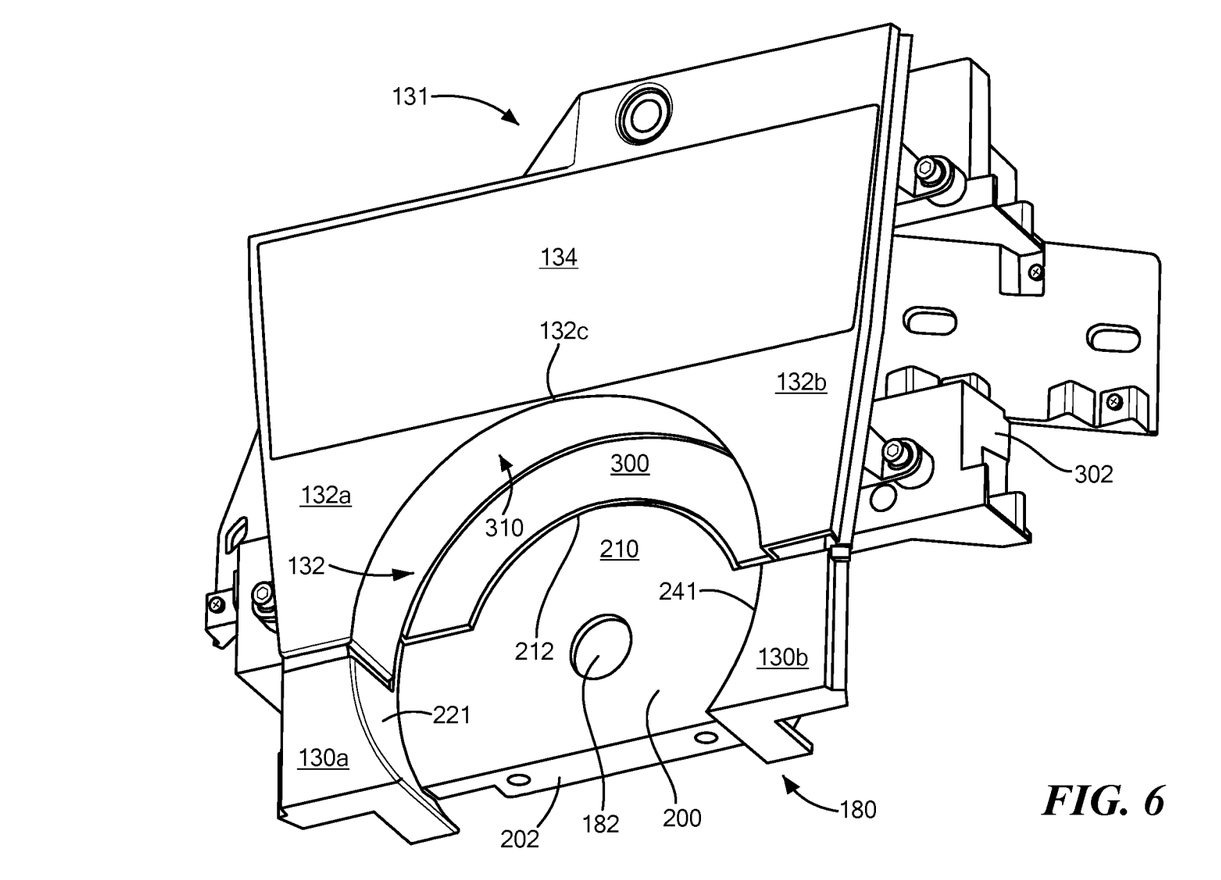
FIG. 6 is a perspective view of the upper and lower wheel well members of the replaceable wheel drive assembly disclosed herein.

FIG. 6 shows a front perspective view of upper wheel well member 132 mounted on mobile base 104 mated with lower wheel well member 180 on the removable wheel drive assembly 110. In this view, wheel 160 and tire 162 are not depicted, so the engagement of upper and lower wheel well members may be clearly seen. Moreover, base portion 202 of lower wheel well member 180, which is normally connected to mounting bracket 140 of wheel drive assembly 110, is shown to be disconnected. This is also to more clearly depict the engagement of upper wheel well member 132 and lower wheel well member 180.

Forming part of upper wheel well 132 is a thin arched flange member 300, which is part of frame portion 302. Frame portion 302 is part of the mobile base frame 120 shown in FIG. 1. Thus, upper wheel well member 132 comprises arched flange member 300 and upper wheel well portion 131. Leg portions 132*a* and 132*c* and arch 132*c* define an inner surface 310, which act as an upper fender for tire 162. The inner surface 310 has a surface width approximately the same width as surfaces 221 and 241, respectively, of first and second fenders 220 and 240. Thus, together the first and second fenders 221 and 241 and surface 310 form a fender for tire 162 with a very small gap between the tire surface and the fender as shown in FIG. 5A. This design guards against safety issues, such as finger entrapment between wheel and wheel well.

When lower wheel well portion 180 is mated with upper wheel well portion 132, curved or arched top surface 212 of central section 210 engages with complementarily curved/arched flange member 300, together forming a closed or sealed surface bounded by fender surfaces 240, 241, and 310. The only opening in the surface is aperture 182 through which the axle for mounting wheel 160 is disposed. The region in which wheel 160 and tire 162 are mounted is sealed to limit/prevent dust (and other matter) from entering the motor drive unit 170.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A mobile robot having a removable wheel-drive assembly, comprising:
    a mobile base having a chassis and a first wheel well member including a flange;
    a removable wheel drive assembly, including:
        a mounting bracket configured to be removably connected to the chassis of the mobile robot proximate the first wheel well member;
        a motor drive unit disposed on the mounting bracket;
        a wheel connected to the motor drive unit via an axle; the wheel having a tire disposed thereon; and
        a second wheel well member disposed on the mounting bracket and positioned between the motor drive unit and the wheel, the second wheel well member including a central section having an aperture through which the axle passes and a top surface;
    wherein the top surface of the central section of the second wheel well member engages with the flange of the first wheel well member of the mobile base when the removable wheel drive assembly is mounted on the mobile base;
    wherein the second wheel well member includes a first side section extending in a first direction from the central section and a second side section extending in a second direction from the central section, wherein the second direction is opposite the first direction; and
    wherein the second wheel well member includes a first curved fender extending outwardly from a face of the first side section and positioned proximate a tread surface of the tire; wherein the first curved fender is conformed with a curve of the tread surface of the tire; and wherein the second wheel well member includes a second curved fender extending outwardly from a face of the second side section and positioned proximate the tread surface of the tire; wherein the second curved fender is conformed with the curve of the tread surface of the tire.

2. The mobile robot of claim 1 wherein the flange of the first wheel well member is arched and the top surface of the central section of the second wheel well member is arched and has a curvature that conforms with a curvature of the arched flange of the first wheel well member.

3. The mobile robot of claim 2 wherein the arched flange of the first wheel well member and the arched top surface of the central section of the second wheel well member each have a curvature which conforms with the curvature of the wheel; and wherein when the arched flange of the first wheel well member and the arched top surface of the central section are mated they form a wheel well surface.

4. The mobile robot of claim 3 wherein the wheel well surface is spaced less than 2 mm from the tire.

5. The mobile robot of claim 1, wherein the second wheel well member further includes a first wheel well cover having a curved edge affixed to an edge of the first curved fender and extending in the first direction away from the first curved fender; and a second wheel well cover having a curved edge affixed to an edge of the second curved fender and extending in the second direction away from the second curved fender.

6. The mobile robot of claim 1, wherein the second wheel well member includes a base portion connected to the mounting bracket.

7. The mobile robot of claim 1 wherein the mounting bracket is connected to the chassis of the mobile robot with a plurality of fasteners.

8. The mobile robot of claim 1 wherein the motor drive unit is a right-hand drive unit including a motor and a gearbox.

9. The mobile robot of claim 1 wherein the first curved fender has a first surface with a width substantially equal to a width of a tread surface of the tire and wherein the second curved fender has a second surface with a width substantially equal to the width of the tread surface of the tire.

10. The mobile robot of claim 9 wherein the first wheel well member includes an arched surface with a width substantially equal to a width of a tread surface of the tire and having a first end aligned with the first surface of the first curved fender and a second end aligned with the second surface of the second curved fender when the when the removable wheel drive assembly is mounted on the mobile base.

11. The mobile robot of claim 10 wherein the first surface, the second surface, and the arched surface are each spaced less than 4 mm from the tread surface of the tire.

12. The mobile robot of claim 10 wherein the flange of the first wheel well member is adjacent to, and extends in a direction perpendicular to, the arched surface of the first wheel well member.

* * * * *

UNITED STATES PATENT AND TRADEMARK OFFICE
CERTIFICATE OF CORRECTION

PATENT NO. : 12,240,550 B2
APPLICATION NO. : 17/532164
DATED : March 4, 2025
INVENTOR(S) : Fiore et al.

Page 1 of 1

It is certified that error appears in the above-identified patent and that said Letters Patent is hereby corrected as shown below:

In the Claims

In Column 8, Line 53:
Replace "surface of the second curved fender when the when the" with "surface of the second curved fender when the"

Signed and Sealed this
Tenth Day of June, 2025

Coke Morgan Stewart
*Acting Director of the United States Patent and Trademark Office*